United States Patent
Gravelle et al.

(10) Patent No.: US 12,483,870 B2
(45) Date of Patent: *Nov. 25, 2025

(54) VEHICLE TRACKING SYSTEM USING SMART-PHONE AS ACTIVE TRANSPONDER

(71) Applicant: Amtech Systems, LLC, Albuquerque, NM (US)

(72) Inventors: Kelly Gravelle, Poway, CA (US); John Todd Elson, Albuquerque, NM (US); Greg Lantz, Albuquerque, NM (US); Michael Melville, Albuquerque, NM (US); Paul Hamel, Albuquerque, NM (US)

(73) Assignee: Amtech Systems, LLC, Albuquerque, NM (US)

(*) Notice: Subject to any disclaimer, the term of this patent is extended or adjusted under 35 U.S.C. 154(b) by 0 days.

This patent is subject to a terminal disclaimer.

(21) Appl. No.: 18/742,545

(22) Filed: Jun. 13, 2024

(65) Prior Publication Data

US 2024/0334168 A1    Oct. 3, 2024

Related U.S. Application Data

(62) Division of application No. 17/345,274, filed on Jun. 11, 2021, now Pat. No. 12,015,969, which is a
(Continued)

(51) Int. Cl.
*H04W 4/40*     (2018.01)
*H04B 7/10*     (2017.01)
(Continued)

(52) U.S. Cl.
CPC .............. *H04W 4/40* (2018.02); *H04B 7/10* (2013.01); *H04W 4/021* (2013.01); *H04W 4/80* (2018.02); *H04W 52/0241* (2013.01)

(58) Field of Classification Search
CPC ......... H04W 4/40; H04W 4/80; H04W 4/021; H04W 52/0241; H04B 7/10
See application file for complete search history.

(56) References Cited

U.S. PATENT DOCUMENTS 4,823,138 A    4/1989    Shibano et al.
4,906,938 A    3/1990    Konopka
(Continued)

FOREIGN PATENT DOCUMENTS

EP    1517271 A1    3/2005

*Primary Examiner* — John J Lee
(74) *Attorney, Agent, or Firm* — Banner & Witcoff, Ltd.

(57) ABSTRACT

A system for tracking vehicle position using a smart phone in the vehicle as an active transponder, which is detected by roadside equipment is disclosed. In an embodiment, the system uses existing RF transceivers on the smart-phone, such as Bluetooth LE or WiFi to periodically transmit an identifying message. Road-based equipment detects and locates the smart phone. In a further embodiment, the smart phone is alerted by roadside beacons and only then responds with its identification information. Processing can be performed either on the smart phone or by roadside or central office equipment as is the case in prior art active or passive transponder-based tolling systems. Vehicle location detection can be enhanced through the use of directional antenna matrices such as a Butler matrix. The system can be used for automated roadway tolling and monitoring.

20 Claims, 8 Drawing Sheets

Related U.S. Application Data division of application No. 15/058,951, filed on Mar. 2, 2016, now Pat. No. 11,039,284.

(60) Provisional application No. 62/266,422, filed on Dec. 11, 2015, provisional application No. 62/214,638, filed on Sep. 4, 2015, provisional application No. 62/184,162, filed on Jun. 24, 2015, provisional application No. 62/156,090, filed on May 1, 2015, provisional application No. 62/127,649, filed on Mar. 3, 2015.

(51) Int. Cl.
*H04W 4/021* (2018.01)
*H04W 4/80* (2018.01)
*H04W 52/02* (2009.01)

(56) References Cited

U.S. PATENT DOCUMENTS

| | | |
|---|---|---|
| 4,908,629 A | 3/1990 | Apsell et al. |
| 5,086,389 A | 2/1992 | Hassett et al. |
| 5,144,553 A | 9/1992 | Hassett et al. |
| 5,253,162 A | 10/1993 | Hassett |
| 5,289,183 A | 2/1994 | Hassett et al. |
| 5,347,274 A | 9/1994 | Hassett |
| 5,351,187 A | 9/1994 | Hassett |
| 5,406,275 A | 4/1995 | Hassett et al. |
| 5,592,181 A | 1/1997 | Cai et al. |
| 5,694,322 A | 12/1997 | Westerlage et al. |
| 5,717,389 A | 2/1998 | Mertens et al. |
| 5,751,973 A | 5/1998 | Hassett |
| 5,805,082 A | 9/1998 | Hassett |
| 5,864,831 A | 1/1999 | Schuessler |
| 5,917,423 A | 6/1999 | Duvall |
| 5,973,601 A | 10/1999 | Campana, Jr. |
| 6,198,528 B1 | 3/2001 | Maynard |
| 6,653,946 B1 | 11/2003 | Hassett |
| 6,816,707 B1 | 11/2004 | Barker et al. |
| 6,876,858 B1 | 4/2005 | Duvall et al. |
| 6,975,997 B1 | 12/2005 | Murakami et al. |
| 7,012,547 B2 | 3/2006 | Hassett |
| 7,224,291 B2 | 5/2007 | Hassett |
| 7,375,648 B1 | 5/2008 | Mulka et al. |
| 10,134,210 B1 | 11/2018 | Gravelle et al. |
| 2003/0146835 A1 | 8/2003 | Carter |
| 2003/0146852 A1 | 8/2003 | O'Dell |
| 2003/0189484 A1 | 10/2003 | Rust et al. |
| 2003/0189498 A1 | 10/2003 | Kakihara et al. |
| 2004/0075532 A1 | 4/2004 | Ueda et al. |
| 2004/0119609 A1 | 6/2004 | Solomon |
| 2004/0203932 A1 | 10/2004 | Yamagishi et al. |
| 2005/0065779 A1 | 3/2005 | Odinak |
| 2005/0097018 A1 | 5/2005 | Takida |
| 2005/0179563 A1 | 8/2005 | Kelley |
| 2006/0015394 A1 | 1/2006 | Sorensen |
| 2006/0200379 A1 | 9/2006 | Biet |
| 2006/0258367 A1 | 11/2006 | Chiang |
| 2007/0011040 A1 | 1/2007 | Wright et al. |
| 2007/0159315 A1 | 7/2007 | Murata et al. |
| 2007/0275731 A1 | 11/2007 | Alfert et al. |
| 2008/0258936 A1 | 10/2008 | Chitor et al. |
| 2008/0280624 A1 | 11/2008 | Wrappe |
| 2009/0024458 A1 | 1/2009 | Palmer |
| 2009/0121898 A1 | 5/2009 | Jia et al. |
| 2009/0184847 A1 | 7/2009 | Kohli et al. |
| 2010/0076878 A1 | 3/2010 | Burr et al. |
| 2010/0106567 A1 | 4/2010 | McNew et al. |
| 2010/0151784 A1 | 6/2010 | Grau Besoli et al. |
| 2010/0161392 A1 | 6/2010 | Ashby et al. |
| 2010/0198498 A1 | 8/2010 | Jansen |
| 2010/0287038 A1 | 11/2010 | Copejans |
| 2011/0071880 A1 | 3/2011 | Spector |
| 2011/0131154 A1 | 6/2011 | Faber et al. |
| 2012/0022944 A1* | 1/2012 | Volpi ................. G06Q 30/0207 705/14.1 |
| 2013/0103200 A1 | 4/2013 | Tucker et al. |
| 2013/0317895 A1* | 11/2013 | Turner ................. H04W 4/023 705/14.27 |
| 2014/0154686 A1 | 6/2014 | Horton et al. |
| 2014/0236778 A1 | 8/2014 | Villardito |
| 2014/0277935 A1* | 9/2014 | Daman ................. B60N 2/002 348/148 |
| 2014/0314216 A1 | 10/2014 | Penberthy et al. |
| 2015/0251674 A1 | 9/2015 | Benkert |
| 2015/0369618 A1* | 12/2015 | Barnard ................. H04L 1/08 701/491 |
| 2016/0203651 A1 | 7/2016 | Heath et al. |
| 2017/0041452 A1 | 2/2017 | Amann |
| 2017/0042432 A1 | 2/2017 | Adib et al. |
| 2017/0142543 A1 | 5/2017 | Ossin et al. |
| 2017/0236420 A1 | 8/2017 | Varoglu et al. |
| 2017/0268890 A1 | 9/2017 | Barnard et al. |
| 2017/0311228 A1 | 10/2017 | Zavesky et al. |
| 2017/0374641 A1 | 12/2017 | Batra et al. |

\* cited by examiner

VEHICLE TRACKING SYSTEM USING SMART-PHONE AS ACTIVE TRANSPONDER

CROSS REFERENCE TO RELATED APPLICATIONS

This application is a divisional of U.S. patent application Ser. No. 17/345,274, filed Jun. 11, 2021, which is a divisional of U.S. patent application Ser. No. 15/058,951, filed Mar. 2, 2016, which claims priority under 35 U.S.C. 119(e) from U.S. Provisional Patent Application No. 62/266,422 filed Dec. 11, 2015; U.S. Provisional Patent Application No. 62/214,638 filed Sep. 4, 2015; U.S. Provisional Patent Application No. 62/184,162 filed Jun. 24, 2015; U.S. Provisional Patent Application No. 62/156,090 filed May 1, 2015; U.S. Provisional Patent Application No. 62/127,649 filed Mar. 3, 2015; and all bearing the same title as the present application. The entire disclosures of the applications listed above, including any drawings and appendices are hereby incorporated herein by reference in their entireties.

FIELD OF THE INVENTION

The invention relates generally to the field of vehicle tracking and tolling.

BACKGROUND

The field of electronic vehicle tracking for tolling and other purposes has seen many iterations over the years. These include the use of vehicle-based backscatter transponders detected and communicated with by roadside equipment, active transponders detected and communicated with by roadside equipment, hybrid transponders having both active and backscatter functions; video monitoring of vehicle license plate and other placards. Cellular telephones have also been described for use in tolling systems, alone or in combination with the aforementioned types of transponders, including in application Ser. No. 13/398,337 by one or more of the present inventors.

One problem in tolling applications that exists regardless of the technology used is determination of the roadway lane in which the vehicle is travelling. This is critical for several reasons. Firstly, because open road tolling systems frequently employ multiple transponder detection antennas and systems to cover multiple lanes of travel, it is necessary to accurately determine lane of travel so that vehicles are not recorded more than once per crossing. Secondly, various tolling and roadway traffic management operations provide incentives and/or restrictions for vehicles of different types and occupancy levels, these include the ability to travel in restricted lanes, thus it is necessary to determine if a vehicle is travelling in the required or allowed lane.

The present invention is directed to novel approaches to vehicle tracking and tolling using smart phones as active transponders. A smart phone is defined here as a cellular phone that also has capability to load and run application programs (apps) and that has wireless transceivers beyond the radio used to send voice and data to a cellular network.

DETAILED DESCRIPTION

Figure 1:
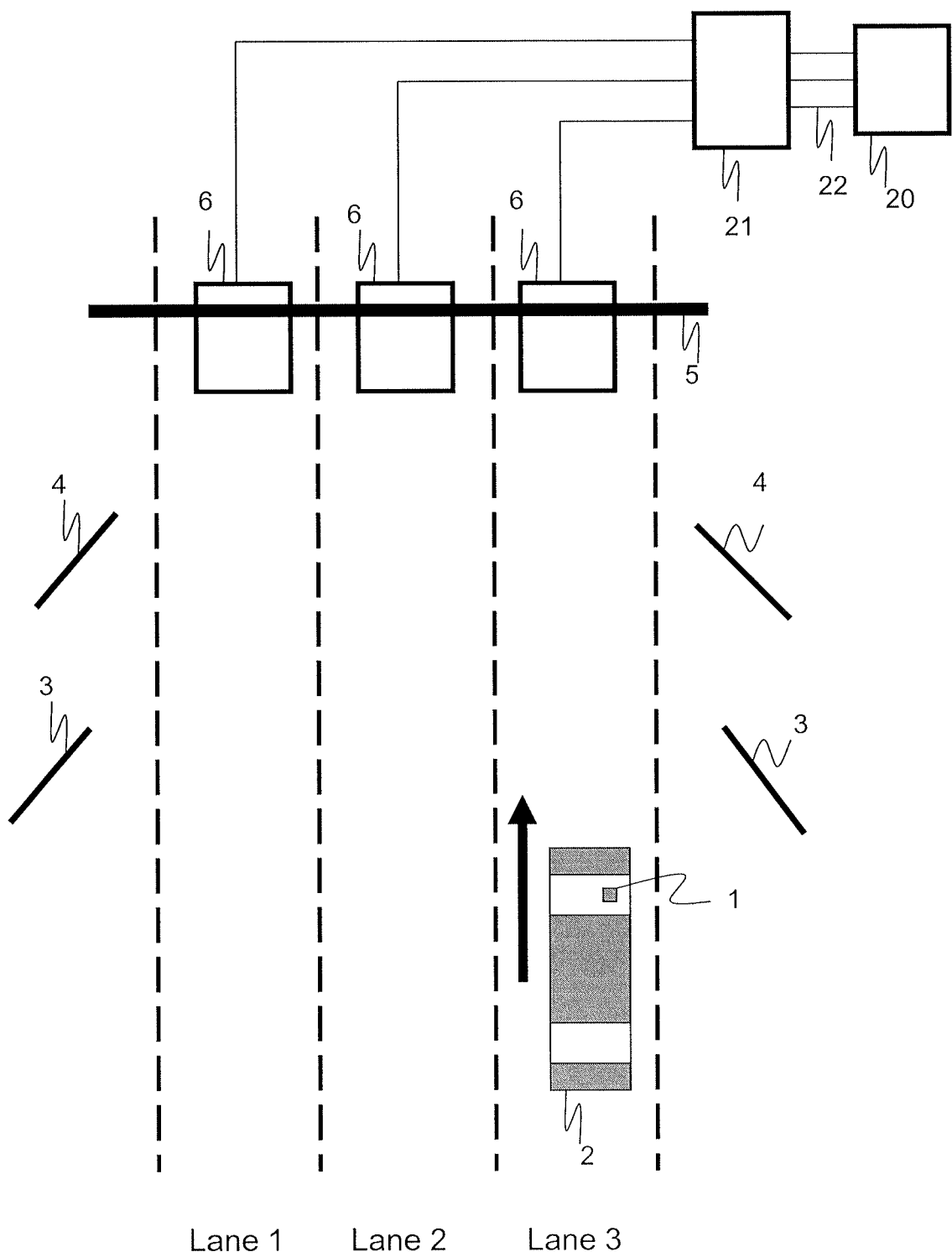
FIG. 1 is a diagram of an exemplary embodiment of the inventive system.
Figure 2:
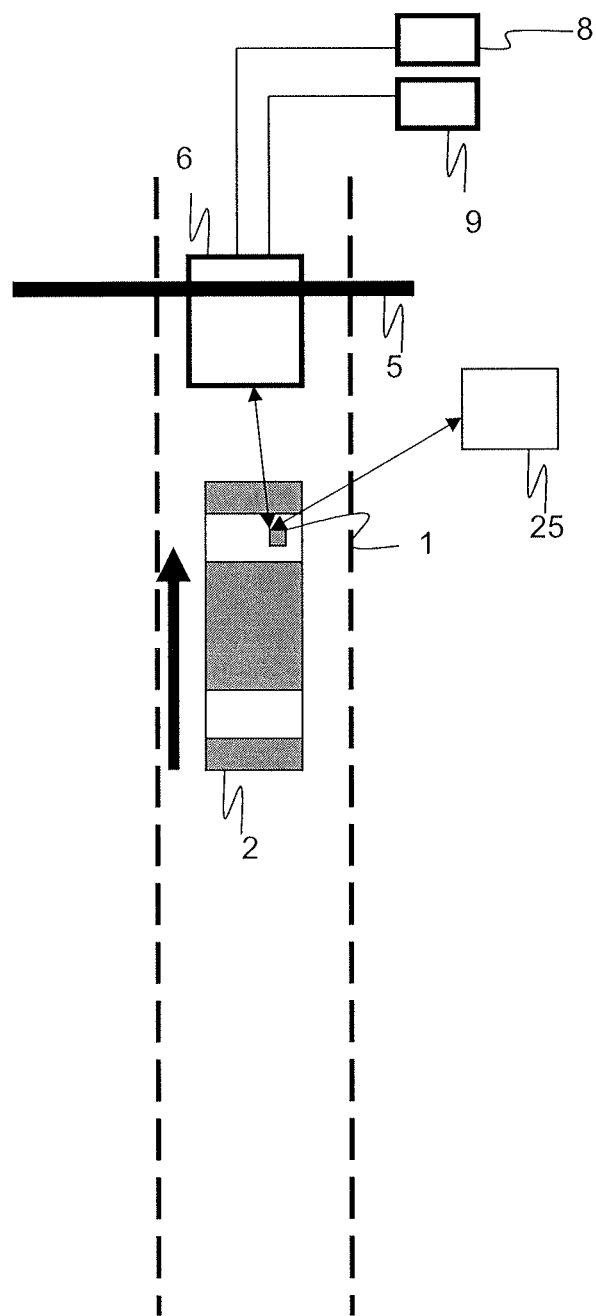
FIG. 2 is a diagram of an exemplary embodiment of the inventive system.

Most generally, the system consists of vehicle-based smart phones interacting with external fixed transceivers mounted over the roadway or beside it. The phones and external transceivers are capable of two-way communications, and both transmit and receive functions can be utilized in the system.

The system concept of operations may take several forms:
The phone may transmit to the fixed transceiver
The phone may receive from the fixed transceiver
There may be two-way communication between the fixed transceiver and phone
The wireless protocol may be Bluetooth® Low Energy (BLE), IEEE 802.11/WiFi, or an emergent protocol
A fixed transceiver may utilize a multi-beam antenna
A fixed transceiver may utilize one or more antennas, each providing a single beam covering a single lane or geographic area
Determination of the vehicle's lane of travel or area may be computed by:
A controller in communication with the fixed transceivers, or
The mobile unit. In this case, the mobile can transmit its lane number or area to a back office via cellular network, WiFi, BLE, RFID, or any other wireless protocol in use in the phone.

Communication Protocols

Standard radio protocols such as WiFi and BLE may be used for the transaction, and in principal any protocol with relevant hardware in the phone may be used subject to practical restrictions inherent in the protocol, hardware, and phone software. WiFi probe requests and BLE advertisements are examples of signal formats that can function as beacons in this system. The system can rely on this message alone for lane determination, or additionally utilize responses to the beacon.

To communicate with the smart phone app, fixed transceivers that utilize WiFi and/or BLE protocols are installed in the lane and connected to appropriate antennas. Messages from the phone contain a unique identifier or ID; these messages can be evaluated for received signal strength indication (RSSI). Lane position or proximate antenna position can be determined at a roadside server connected to the transceivers by Ethernet and TCP/IP or other convenient protocol. When a phone message is received at more than one transceiver across the roadway, the unique identifier, along with the RSSI, are sent to the server.

Alternately, the lane determination may be made by the phone application resident and running on the phone, based on messages sent from the fixed transceivers to the phone.

Phone as Transmitter

In an embodiment, the invention involves configuring a smart phone as an active transponder for vehicle tracking and/or roadway tolling. The smart phone is adapted to transmit a message periodically that contains a known address or identifier. An exemplary system is described with reference to FIGS. 1-4, with like numbers representing the indicated elements. An existing radio supported on the smart phone 1 such as the WiFi radio or the BLE radio is used to generate these signals. Roadside and/or overhead transceivers detect the transmissions to identify the location of the vehicle. The phone must be uniquely associated with data content in the message which is associated with an account used to collect the payment of tolls.

In order to perform this task effectively it is necessary that the phone send messages frequently while within the toll zone. A minimum repetition rate of 10 Hz, or one per 100 milliseconds, is required, but 100 Hz or one per 10 milliseconds is preferred. Depending upon power consumption in this high rep rate mode, it may be necessary to overlay GeoZone functionality, such that the higher rep rate/power consumption mode operates only in the vicinity of toll collection zones, thus creating a low duty cycle operation to preserve cell phone battery capacity. GeoZone functionality can be implemented by comparing current GPS position (established by phone's internal GPS receiver/processor 14) to stored geo-location zones selected to include toll point locations. A limitation on this approach is the maximum number of GeoZones in an iPhone is 20. Alternate methods include using BLE beacons 9 to indicate to the phone application 17 that it is in the vicinity of a toll collection point, or by using WiFi AP's 8 SSID's or MAC addresses that are detected by the phone using the phone's WiFi 15 radio.

Signal Strength of Smart Phone Signal for Lane Determination

The basic concept of identifying the travel lane relies on RSSI, provided by common WiFi and BLE transceivers used in mobile phones and fixed transceivers. RSSI-based algorithms for range and direction determination must be used with care owing to:

Multipath corruption, occurring when the radio wave from a transmitter bounces off obstacles in its path and arrives at the target with relatively small time offsets from the direct path, Antenna patterns with nulls in particular directions, and Sensitivity to polarization.

In any system architecture, it is clear that there are several feasible methods of data processing to determine the lane of travel. The implemented solution also depends on antenna type and location, and also on the disposition of the phone as a transmitter or receiver. In one approach with a phone transmitting and one antenna per lane, the roadside server 20 looks only at messages that meet a minimum threshold of signal strength received from the smart phone, then compares the signal strengths received from each antenna to determine the strongest one over a specified period on the order of 30 ms. As the smart phone traverses the roadway each period has a count assigned based on the strongest signal strength received on an antenna. The most proximate antenna or alternatively the lane of travel is determined to be the antenna or lane with the most counts in a larger second period (roughly 300 ms) or the total such counts during a the entire period required to traverse the section of roadway.

Figure 3:
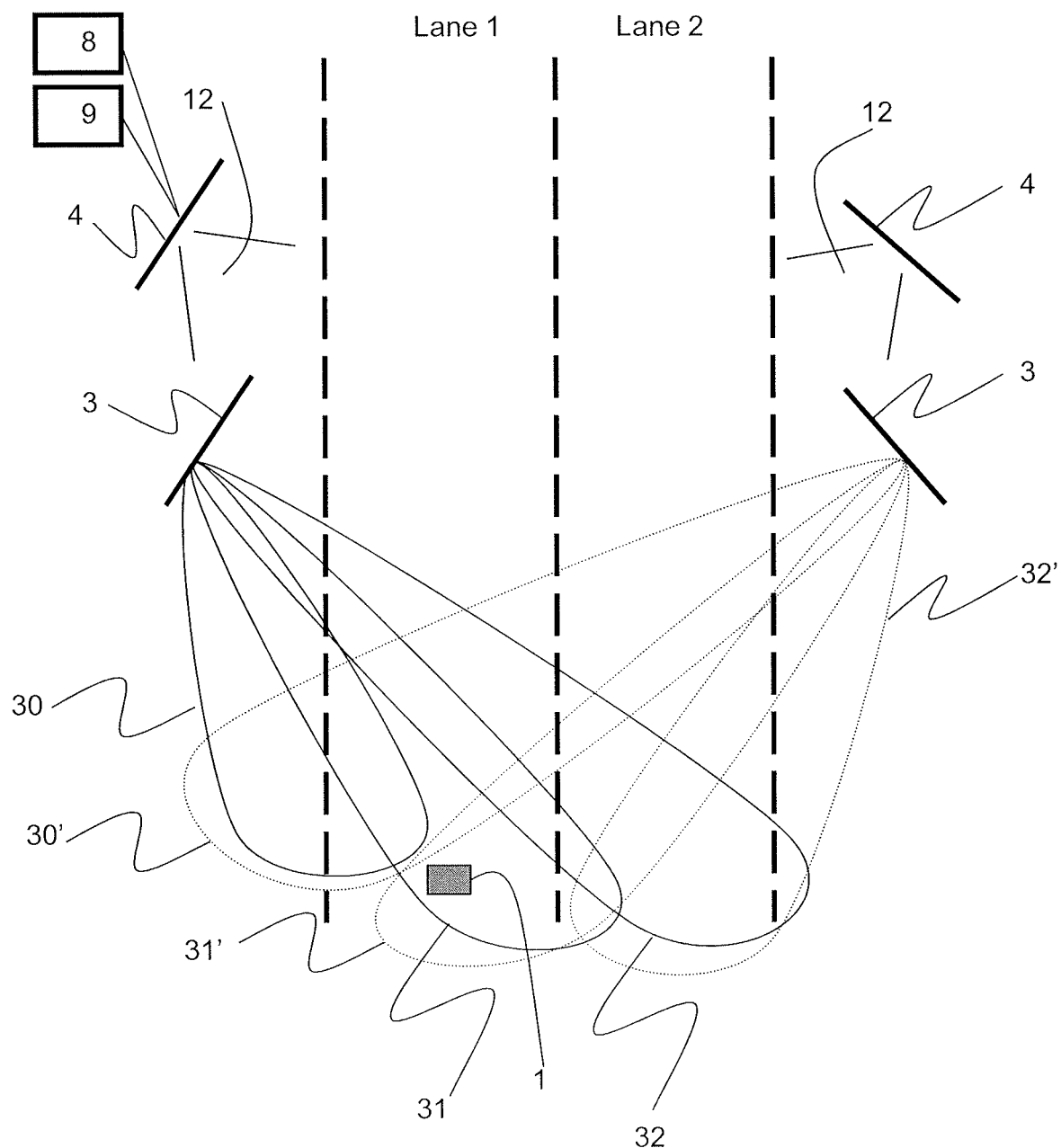
FIG. 3 is a diagram of an exemplary embodiment of the inventive system.
Figure 4:
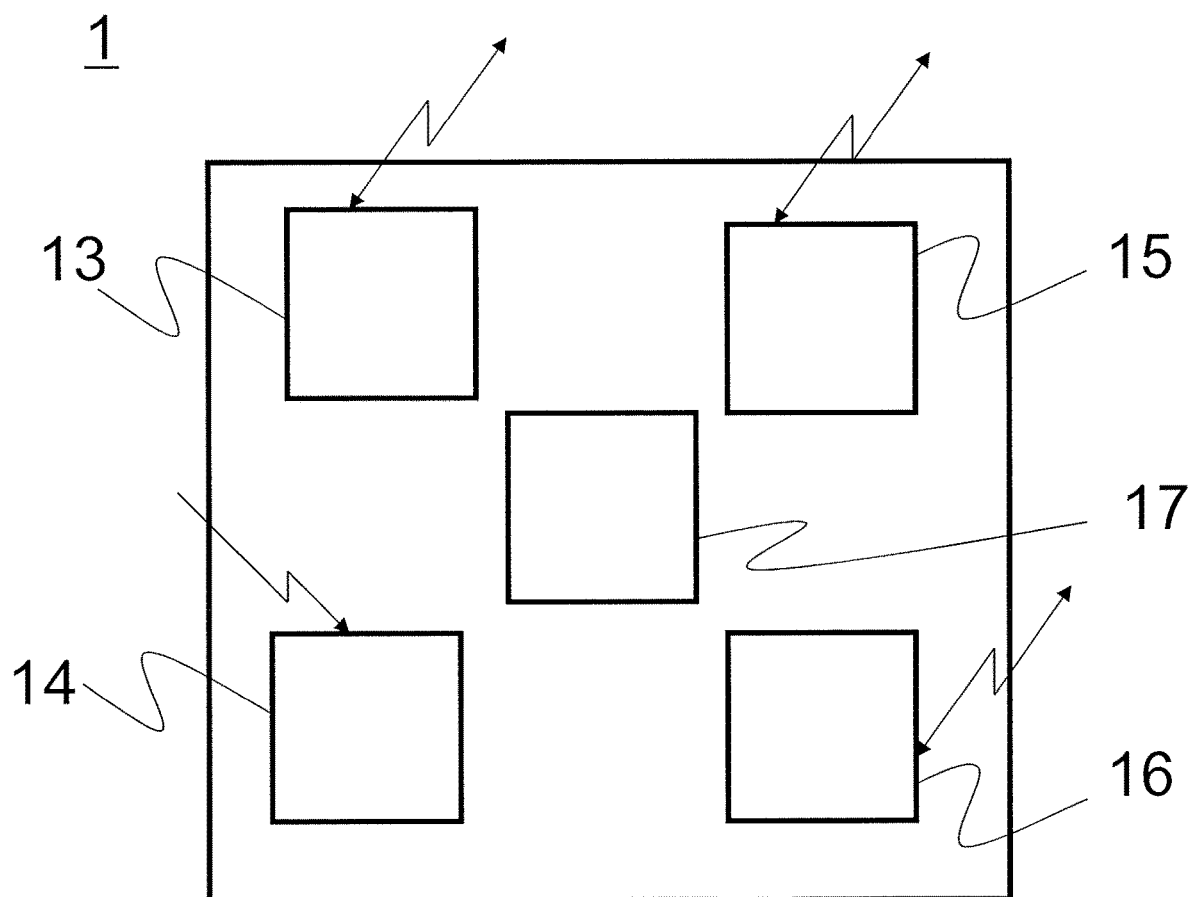
FIG. 4 is a diagram of an exemplary embodiment of the smart phone of the inventive system.

FIG. 3 shows an exemplary design using multi-beam antennas 3 fed by Butler matrices, creating highly directional beam patterns 30, 30', 31, 31', 32 and 32'. By determining the strongest signal path between each antenna and the phone, either received from the smart phone, it is possible to very accurately determine position of the phone and presumable the vehicle. In the example shown, the smart phone is positioned for best reception in beams 31 and 30', and it is a simple matter from there to determine that these beams intersect in Lane 1.

Phone as Receiver

In one variation of the system multiple BLE transmitters, or "beacons" 9, can be installed across the roadway on a gantry 5 and connected to high gain antennas 6. A high gain antenna for purposes of this specification is an antenna with a gain of 8 db or higher.

In an embodiment, the beacon ID and time stamp are included in its transmitted data to allow the mobile to identify its location at a time stamp. The beacon transmits at a high rate, approximately once per 20 milliseconds. The beacon time stamp is synchronized to local system time to resolve transactions. Specialized beacons with high gain can be used for tracking or localization.

An exemplary beacon is the iBeacon, which uses a protocol developed by Apple®. Various vendors have since made iBeacon-compatible hardware transmitters that advertise their ID to nearby portable electronic devices. The technology enables smart phones, tablets and other devices to perform actions when in close proximity to an iBeacon.

In an embodiment, the phone receives messages from multiple Beacons and stores relevant data fields such as beacon ID, plaza and lane number, latitude/longitude, time and date, and RSSI.

As battery life on mobile devices is a key product differentiator, some devices limit the transmit rate or the effective receive rate for wireless transceivers. For example, iPhones apply such limits to the BLE functionality, resulting in A maximum transmission rate that is less than the BLE standard maximum.

A diminished sample rate when the device is scanning for beacons; that is, the sample rate is less than the BLE transmission standard maximum, so samples cannot keep up with beacons transmitting at that rate.

These restrictions are relaxed, however, when the iPhone is detecting an iBeacon, so while it is in range of an iBeacon it is able to record BLE beacon data in background/sleep mode at nearly the same rate as the beacon advertising rate. This requires a system architecture that contains iBeacons to "awaken" iPhones® and beacons to provide advertisements for the toll transaction. The iBeacons must have a coverage zone that extends well upstream from the toll plaza to provide sufficient time for the phones to be ready to record beacon data when travelling through the plaza. A single antenna or multiple low gain antennas may be used to provide a wide area communications zone to accomplish successful reception of the iBeacon message. These are used in combination with high gain antennas used for the subsequent beacon messages which form a more constrained communication zone. The phone can transmit log data to a server for post processing and analysis, or preferentially analyze it to determine lane number and transmit that information to a server.

The simplest approach, when the phone is acting as a receiver and beacon transmitters are fixed across a roadway, is to transmit BLE undirected non-connectable advertisements. The format of the advertisement message is defined in the BLE standard, and includes 31 bytes of user-defined data that can include all relevant information for a toll transaction. The phones operate as BLE passive scanners and do not transmit. An individual phone would likely hear multiple beacons as it traverses a toll plaza, and would have to process the data to determine lane location or transfer the data to a back office for post-processing, including lane location.

Non-connectable, undirected BLE advertisements have a minimum time interval between advertisements of 100 msec. This time represents 14.7 feet for a vehicle traveling at 100 mph. Shorter time intervals are necessary for accurate signal strength histories, and are also useful for timing coordination with existing sub-systems in a toll plaza such as video camera systems. Connectable, directed BLE advertisements have a minimum time interval between advertisements of 20 msec, or 2.9 feet for a vehicle traveling at 100 mph. This provides much improved resolution while eliciting BLE scan requests from mobiles.

Further time resolution may be achieved by including multiple BLE modules in a beacon. For instance, two beacons can share an RF connection to an antenna, making the effective advertisement interval equal to 10 msec. The mobile application would have to correctly interpret advertisements from both beacons as coming from the same lane, a simple matter of software. Finally, a high duty cycle mode exists in BLE connectable directed advertisements, where the maximum advertising interval is 3.75 msec. This would provide a significant increase in resolution, perhaps more than necessary for a toll system. However, not all devices support this high duty cycle mode.

The data recorded on the phone would likely include, at a minimum, time stamp, beacon ID, and RSSI for each sample. The sample plot in FIG. 8 displays BLE RSSI recorded on a phone located in a vehicle traveling through a lane with a Beacon overhead in the travel lane and another Beacon overhead in an adjacent lane. The difference in peak signal strength between two Beacons is clear, and one Beacon is clearly stronger for the majority of the record.

This concept is not restricted to BLE, as the wireless protocol could be WiFi or any other that is available on a smart phone.

Signal Strength of Beacon Signal for Lane Determination

In an approach, multiple messages may be transmitted by a BLE transceiver, or "beacon", through a high gain antenna and received by the smart phone. The high gain antenna will be generally set up on an overhead gantry with maximum gain direction pointing towards the road surface or slightly up-tilted toward vehicles as they approach the toll point, forming a capture zone on the road where vehicles are in position to communicate with the beacons. While the capture zones for each beacon will overlap in a typical case of one antenna per standard-width lane, higher signal strengths tend to occur near the antenna boresight. Because the lane numbers are associated with beacons with known IDs, the location of the vehicle can be determined by analyzing RSSI data for the beacons captured on the phone. The phone application 17 may evaluate the number of messages received and the RSSI values from each beacon to determine the position of the phone relative to the beacons, hence the lane. The toll can then be collected from an account associated with the unique ID for the vehicle passing the toll point in that particular lane, wherein the lane/proximate antenna/beacon information is sent with the unique ID to the toll system and or account service center. One approach in this case is that the application on the phone compares the signal strengths received from each beacon antenna to determine the strongest one over a specified period, say 30 milliseconds. As the phone traverses the roadway, each period has a count assigned based on the strongest signal strength received on an antenna, the most proximate antenna or alternatively the lane of travel is determined to be the antenna or lane with the most counts in a larger second period (say 300 milliseconds) or the total such counts during a the entire period required to traverse the section of roadway.

Another simple algorithm to make the lane determination is to examine the strongest N samples for all beacons and average them to create a single number for each lane. This may be thought of as a low-order estimate of the area under the curves, proportional to energy, and possessing increasing accuracy as N increases. As N increases, more calculations are required which increase the burden on the processor. Hence a proper value for N is a tradeoff between accuracy and processor burden. In practice, the number N can be arrived at through trial and error. In the case summarized in FIG. 8, the difference in the averages between the correct lane and adjacent lane is 13 dB, using N=IO. The difference of 13 dB is also approximately equal to the peaks of the curves. Utilizing a single peak value would provide the correct answer in many cases, but RF multipath can corrupt a single sample more easily than several samples.

Figure 8:
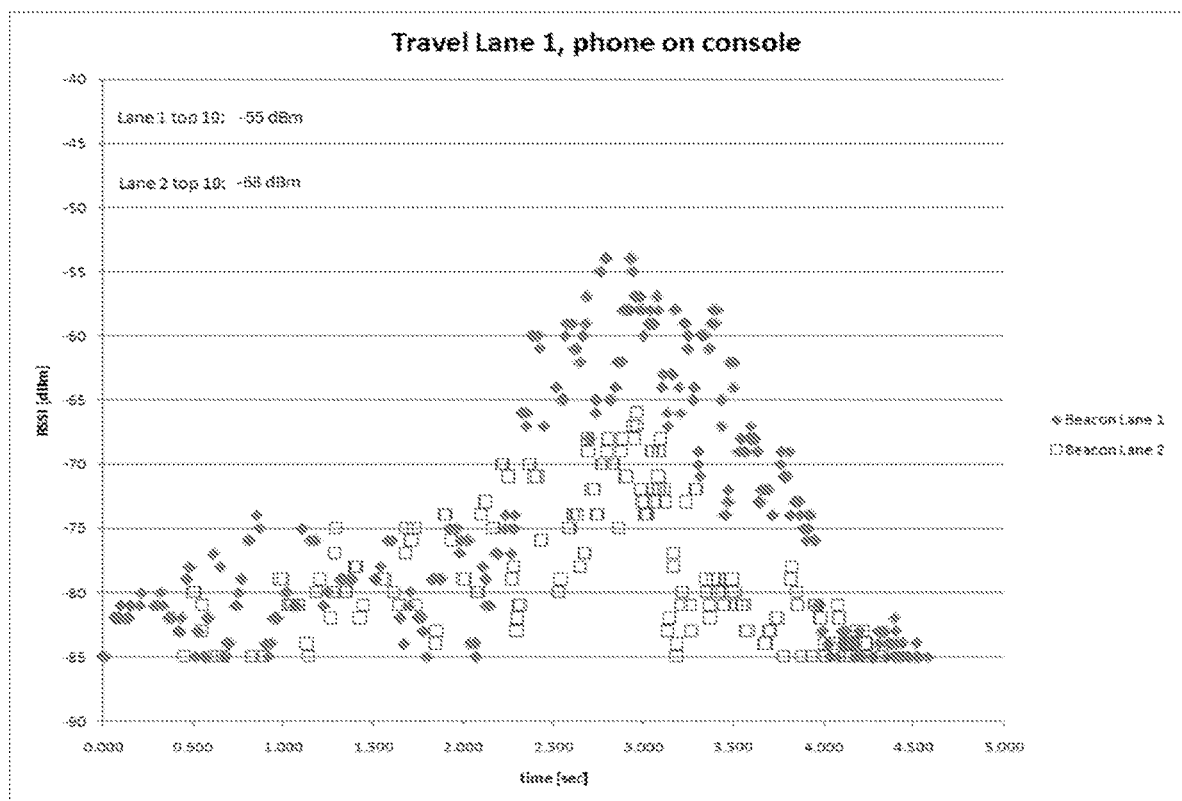
FIG. 8 is a graph of RSSI versus time for beacons in two locations.

To assign the best time stamp for correlating the vehicle passage to other lane sensors, a straightforward algorithm is to use the median of the time stamps for the five data points with highest RSSI in the assigned lane as can be performed for example on the plot in FIG. 8. This synchronized and accurate time stamp combined with accurate lane position allows the transaction to be accurately post-processed into the toll system transaction.

To use the system, users download an application with the foregoing capabilities to the smart phone. Upon download of the phone application, the user will use application-supported account management features to set up an account with the appropriate toll authority or third party service provider, create a link between the unique ID/address information to the account, and provide a means for the settlement of toll charges associated with the unique ID (such as a credit card).

Zone Definition with Geo-Fencing and iBeacons®

The overall goal is to be able to determine which lane a vehicle and phone are in based on messages received from multiple BLE beacons. In an embodiment, upon receiving beacon messages and leaving a Geo-fence area or iBeacon® zone, the raw beacon log data is transferred from smart phone to server for transaction analysis/processing. See FIG. 8 for diagram of beacons within a Geo-fence.

Smart Phone Stores Beacon Time Information and Reports Later

Alternatively, the smart phone application can simply save the Bluetooth® LE beacon messages as the smart phone passes under the high gain beacons on the toll facility. The messages will contain, at a minimum, data identifying the location of the toll lane and the time the beacon message was sent. The smart phone will normally receive multiple messages from multiple beacons while traversing the toll plaza. A clock in the beacon establishes the time in the message and is synchronized to the other toll equipment to a sufficient resolution (say I-100 ms) to allow the transaction to be correlated based on the time of the transaction with other elements of the toll system such as a vehicle detection system or a video-based license plate reading system. This saved data is then sent as soon as practical via any of the smart phone's data connections (Bluetooth®, WiFi, WAN data) to a server where the processing to determine the lane position described above is executed. In this case the server need not be located roadside but can be located anywhere.

In one embodiment a Geo-fence function is used to determine when the buffered BLE beacon messages or processed results should be sent to the server over an available data connection. Geo-fence applications are well known in the art and provide a function to allow a specific area to be defined such that an alert is generated when the Geo-zone area is entered or exited. A Geo-zone can be created around the toll plaza or area. When the area is exited an alert triggers the sending of the processed or unprocessed beacon data to the server for post processing into the toll transaction. Similarly a Geo-zone can be established downstream of the toll point where traffic must traverse, and entry into this Geo-zone can also trigger the sending of buffered data to the server for processing.

It may not be possible given the state of smart phone technology or limitations in smart phone systems to send beacon data in real time to the server. However, because the beacon data contains a time stamp synchronized to the toll system at the toll plaza, a toll transaction can be generated and post-processed with other data collected from other toll sensors proximate to the roadway to form a complete toll transaction. For example, most toll systems include a video-based enforcement/toll system at the toll plaza. Such systems use various techniques well known in the art to take a photo of the vehicle license plate which can later be processed and "read" automatically by a computer. In prior art systems, the toll payment is made by an RFID reader reading an RFID tag associated with a user account that settled to the users credit card or bank account. If this toll payment is made, the photo taken of the license plate is associated with the vehicle need not be processed and can be discarded or stored according to policy. If a payment is not made, either a violation against the vehicle owner of record or a video-based toll against an account or the vehicle owner of record is processed.

One advantage of post processing the transaction data is that substantially all of the data points collected on the transaction between the beacon and the smart phone can be collected and used to determine the lane position and to determine a time stamp for the transaction that best represents when the vehicle passed under the antenna. More data typically means better quality output result for almost any reasonable algorithm used to determine vehicle position relative to the beacon antennas.

Typically a trigger system is used, employing one of many vehicle detection technologies known in the art, to determine the vehicle's location on the roadway to take the photo of the license plate. In order to allow toll payment by smart phone rather than RFID tag, the phone application requires the user to establish an account with the toll authority, or through a private third party account consolidator who sets up a consolidated account for the user with multiple toll agencies. At that time an account identifier is established by the application or by an account server in communication with the application over an internet connection supported by the smart phone. That account identifier is sent by the smart phone when the processed or unprocessed beacon data is sent to the server, typically after a Geo-fence or iBeacon zone exit event occurs to trigger the sending of this data. The trigger point for the license plate photograph is aligned to the direction of maximum gain of the antenna, allowing the determined travel lane to be associated with an accurate time stamp. As this time stamp is also synchronized with the video system, the beacon transaction can be compared to the video transaction to ensure they are from the same vehicle, eliminating the need for the license plate photo to be processed.

Typically, this transaction from the smart phone will not occur in real time. This is because the sending of the data will be triggered by an event such as a GeoZone exit (or entry) event, iBeacon read zone exit, or RSSI residing below a threshold for an elapsed time, all of which occur after the vehicle has passed through the toll plaza. Additional sources of latency in the communications network will add to this. All of the data collected as the vehicle traverses the plaza is available for the algorithm that determines lane and time of passage. It also implies that the photo data and any other associated sensor data pertaining to the toll transaction must be stored for some period of time to allow receipt and processing of the data from the smart phone to create the toll transaction, so that it may be post processed against this stored data as described above. The minimum period of storage, and the resulting storage capacity are determined based on the maximum expected delay in sending and processing the smart phone data so that it may be post processed. Alternatively, all such data may be permanently stored according to policy.

In Apple's® iOS operating system applications that are not actively being used by the user operate in the background. Usually these applications cannot process data or access resources to preserve battery life. In the contemplated system it is highly advantageous to avoid the need for user action, as a matter of customer convenience and driving safety. There are some exceptions in iOS that will allow some processing time to be allocated to an application running in the background. One exception involves the use of geographical areas. Upon entering a geographical area, the phone application can be automatically launched or elevated in priority by the operating system. Upon receipt of BLE data expected by or intended for the phone application, iOS will provide a specific allotment of time for the application to process the BLE data. In one embodiment all of the stored BLE messages received are uploaded to the server over the WAN data link using a web services call.

Another approach to resource conservation while the toll application sits in the background is to create iBeacon zones in the roadways that have beacon zones within them. The iPhone will not log iBeacon advertisements at a rate faster than one per second, regardless of the iBeacon advertisement rate. It will record beacon advertisements much faster in general, and approximately at the same rate as the advertisement itself, if the iPhone® is in range of an iBeacon.

Data Transfer

In a further embodiment, transaction data is stored in a file on the phone. Data can be received and logged even with the phone in sleep mode. Data is downloaded to a server with no user intervention, triggered by an event such as a Geo-fence trigger described above. Because data will not be downloaded in real time, transactions must be post-processed into the toll transaction to be correlated with data taken at the toll area, such as video or camera recording of license plate, and vehicle detection.

Approach Using Conventional Transponder as Repeater

In one alternative, a transponder device is installed in the conventional electronic toll lane in a similar fashion to how test transponders are used today. The transponder acts as a repeater of the information transmitted by the smart phone. The transponder contains a BLE or WiFi transceiver which receives transaction information from the phone to include the phone unique ID. When interrogated by a reader, the transponder will mimic the type of message sent in conventional electronic toll messages with an account ID associated with the phone unique ID. In this way the system described above can be implemented with minimal or no changes in the software and integration of the toll system or conventional back office/service center.

Streamlined Transaction

In another embodiment, BLE beacons broadcast advertisements via antennas 6 that are typically dispersed one per lane, although two per lane may be used, or fewer than one per lane may be used. When received in an application resident on the smart phone 17 these advertisements trigger response messages sent by either the BLE radio 9 or WiFi 8 radio in the smart phone with a data response similar to how prior art active RFID transponders behave today. Simultaneously, these BLE Beacon messages could trigger return messages to the toll system over any combination of WIFI, BLE or common carrier WAN data connection present on almost all smart phones. These responses contain information that is sent to a service center for the settling of toll collection related to the vehicles' use of the roadway. This information is transmitted to the service center either by a toll system network of the type commonly used today (in the case of WIFI or BLE return message) or via the WAN connection 10 directly from the smart phone to the service center, or any combination thereof which provides for redundancy of messaging and therefore enhanced reliability. In all cases the return message with unique identifier is received at the service center where account settlement is performed, and the toll is settled to the account associated with it. In a further embodiment, a smart phone is a receiver initially scanning passively for BLE advertisements from the beacons as it enters a capture zone. Upon decoding an advertisement, the phone optionally sends a BLE Scan Request (SCAN_REQ PDU) to the beacon. The request payload consists of the beacon address and the phone MAC address. The beacon issues a BLE Scan Response (SCAN_RSP PDU) in response to each received SCAN_REQ. The total number of scan responses represents the number of transactions with a phone.

The timestamp for the transaction resides in the scan request payload and must match the timestamp for other toll systems (i.e. video cameras), within an allowable tolerance.

At the completion of the transaction, the system composes an encrypted data packet containing the phone MAC address, time and date, plaza and lane ID. This is sent to a back office via typical means, for example either over land line communications such as an internet connection or wirelessly such as by a cellular data connection, and checked against video data for violations.

RF Considerations

In an implementation utilizing single-beam antennas, each lane will typically contain an overhead antenna 6 with high gain, circular polarization, and sufficient bandwidth to cover the entire ISM band around 2.45 GHz. The antenna points approximately downward, reducing potential for cross lane communication. By contrast, antenna pointing angles near horizontal can allow large vehicles to block the direct RF path of smaller vehicles in the same lane, and multiple phones in different lanes to be transacted with at relatively longer distances where the beams have spread significantly. Pointing downward, therefore, allows easier control of the capture zone.

A high gain antenna with low side lobes and a sharp beam roll off will minimize RF leakage into the adjacent lanes. This pattern must be consistent across the entire ISM band because BLE uses RF frequencies spanning the band.

Finally, circular polarization is preferred in the Beacon antenna because of the variable antenna pattern in the phone. Linear vertical or horizontal polarization could be used, but circular polarization is preferred so as to make the communication link to the phone less sensitive to the orientation of the phone in the vehicle. This allows the user more flexibility for the phone's location inside the vehicle, including the seat, in pocket, on the vehicle's dash board, or in its center console, creating good RF link performance unaffected by orientation of the phone. Most antennas targeting 2.45 GHz devices in mobile phones have nulls in each plane. The location and depth of the nulls is dependent on frequency and polarization, and a circularly polarized Beacon antenna will provide polarization diversity.

Frequency diversity is a de-facto feature of the system when using wireless protocols that utilize a sufficiently large RF frequency band. A large operating frequency band causes phone antenna nulls and RF fades to move as frequency changes. In a BLE system, for example, advertising channels hop between 2402, 2426, and 2480 MHz. The antenna operating band must be at least this large to take advantage of this.

The required antenna features of the system described above enhance chances of the in-lane beacon transacting with the phone, as opposed to the adjacent-lane beacon. It does not entirely rule out cross lane transactions, so an appropriate system will monitor the number of transactions on all beacons for a specific phone and choose the travel lane appropriately.

Multi-Beam Antenna

With smart phones acting as transmitters, the receiving antennas located in the toll plaza may take multiple forms. One embodiment is a pair of multi-beam antennas straddling the roadside to enable angle-of-arrival-based lane determination. A common form for the multi-beam antennas are planar arrays with Butler matrix feed systems.

Butler matrix antenna configurations are known in the art but can be uniquely applied in this case with either the WiFi or the Bluetooth® LE radio signals to track vehicles in which the phones are present and associated. Other forms of directed antenna configurations are also known, see for example U.S. Pat. No. 5,592,181, which is incorporated by reference herein. For example, see the thesis paper: Implementation of a 8×8 Butler Matrix in Microstrip by Henrik Nord incorporated in Appendix A of the provisional Application Ser. 62/214,638 filed Sep. 4, 2015 and the slide presentation Design and Implementation of Butler Matrix—Simultaneous Beam Formation, by Harish Rajagopalan, incorporated as Appendix B in the provisional Application Ser. 62/214,638 filed Sep. 4, 2015. Both of these documents are incorporated by reference herein. The multi-beam antennas can be used on their own for both communications and tracking, but may also be used with a set of low gain antennas where the low gain antennas cover the entire area of interest to allow more time for reliable communications roadway and the multi-beam antennas used for tracking only or primarily for tracking.

Figure 5:
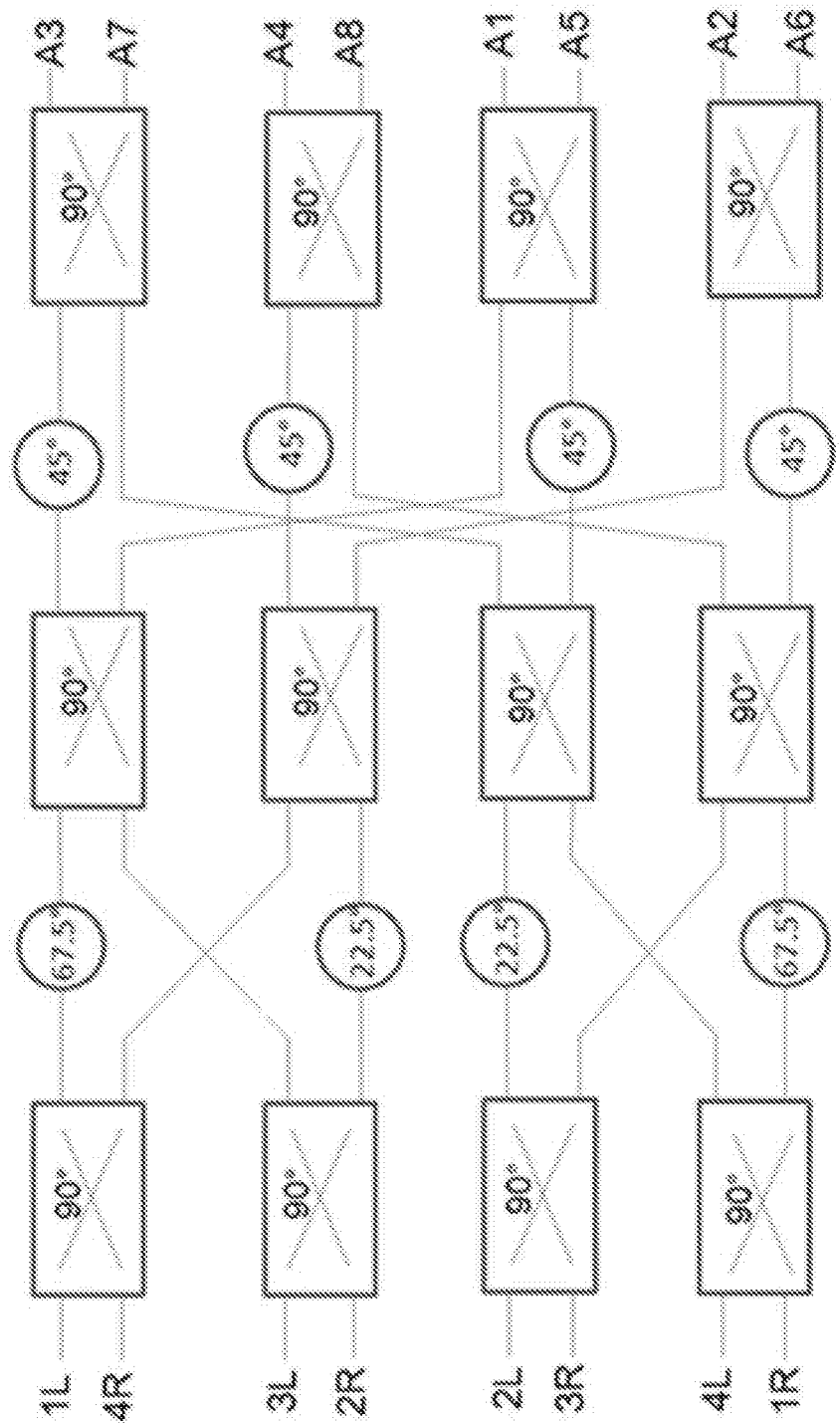
FIG. 5 is a diagram of an exemplary Prior Art 8×8 Butler Matrix antenna array.

The Butler matrix is a well-known beam-former, producing N beams from N groups of radiators. FIG. 5 is a diagram of an 8×8 Butler matrix. It can be thought of as a hardware realization of a Fourier transform, and indeed the diagram is reminiscent of an FFT.

Figure 6:
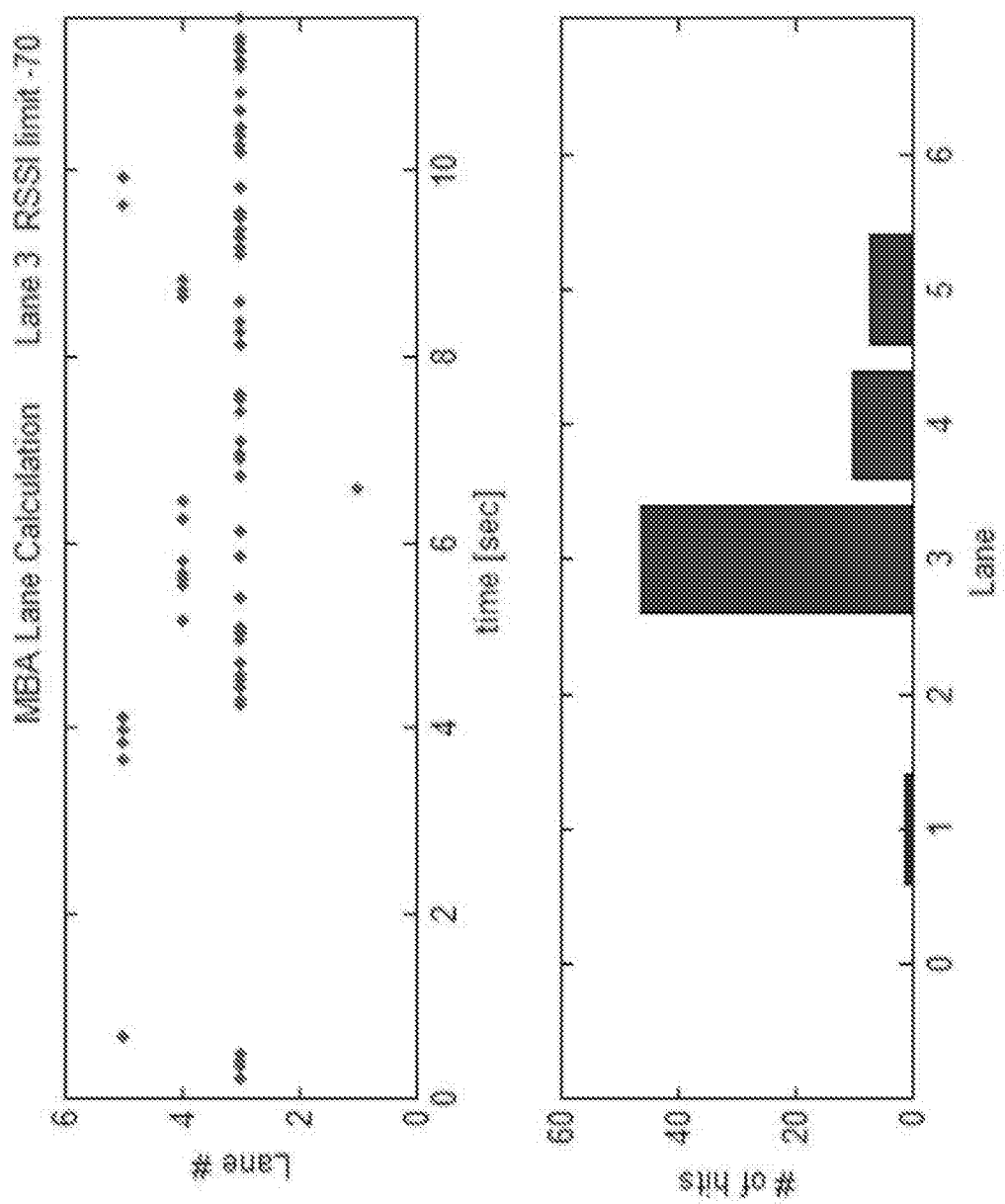
FIG. 6 is test results of a test-setup using two Butler Matrix antenna arrays.
Figure 7:
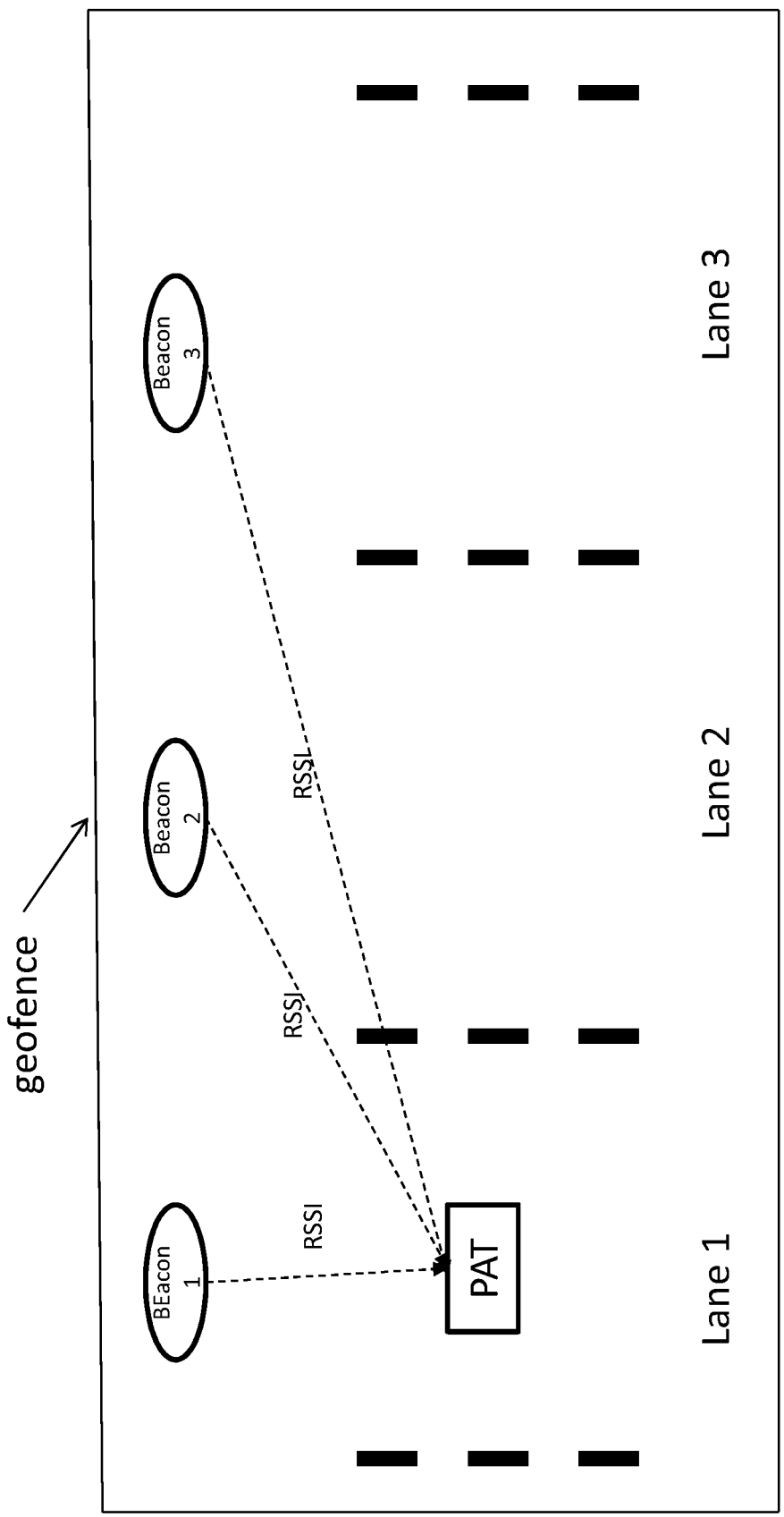
FIG. 7 is a diagram of an exemplary three-lane system bounded by a Geo-fence.

FIG. 6 shows the results of experimental evaluation conducted with two multi-beam antennas installed roadside. The test results showed significant ability to locate the vehicle position across 6 lanes. The graph shows post-processed data: the computed lane number as a function of time, and the total number of hits for each lane. Multipath is evident in hits for lanes beside lane 3 (the actual travel lane). One car at a time was tested.

These experiments were conducted with a 2.45 GHz radio in the vehicle under the dash on the left side of the vehicle, which is a non-ideal position for the transmitter in the vehicle because the signal must reach the receiver via multi-path. Similar, but less severe multi-path can be expected based on the typical locations users will have their phone in the vehicle, be it in the user's pocket, belt, purse, cup holder or passenger seat. All of these locations will potentially see multi-path between the smart phone and exterior antennas, but probably less severe than the conditions of the experiment. Notwithstanding the more severe multi path conditions for the experiment, reasonably good position results were obtained in determining the lane of travel by assigning the transmitter to a lane position by summing the number of points where the peak beam signal strength of the Butler matrix antennas indicated an intersection point in a particular lane and assigning the lane position to the lane with the greatest number of such points as the vehicle traverses a section of roadway.

To use the system, users download an application to the smart phone. Upon download of the phone application, the user will use application supported account management features to set up an account with the appropriate toll authority or third party service provider, create a link between the unique ID/address information to the account, provide a means for the settlement of toll charges associated with the unique ID (such as a credit card).

The test results (FIG. 6) showed significant ability to locate the vehicle position across 6 lanes. The graph shows post-processed data: the computed lane number as a function of time, and the total number of hits for each lane. Multipath is evident in hits for lanes beside lane 3 (the actual travel lane). One car at a time was tested.

Mileage Reporting System for Mileage Based User Fees

In another embodiment, the smart phone application is configured to support the accurate and secure self-reporting of miles driven by taxpayers in jurisdictions where taxes are collected based on the number of miles driven in the jurisdiction. As a possible way to meet policy objectives, California and Oregon have pilot projects and consideration is being given to similar taxation system by the U.S. Federal Government. However a practical, private, easy, accurate and secure way for user to report the mileage and corresponding tax has been lacking.

The basic reporting approach of the invention involves installing BLE beacons at locations convenient to the motorist such as gas stations, oil change facilities, smog check stations and car washes, called reporting facilities. In the preferred embodiment drivers self-report the mileage and pay the tax periodically, perhaps once per quarter or per year. The phone application of the invention makes it easy and secure to report mileage.

The design of the phone application is such that the user enters a reporting facility and parks in a designated location designed to be covered by the BLE beacon. The beacon data includes location data and a secure identifier. In one embodiment the secure identifier is an encrypted combination of the time and location information. The locations are selected and high gain antennas placed such that no more than one vehicle can be parked in a designated location simultaneously.

The phone application recognizes the beacon, processes the data, and starts the procedure. The user is prompted to take a photo of the vehicle odometer reading, and the application records the fact that the photo was taken proximate to the secure beacon and a specific date and time. Next the user is prompted to take a picture of the VIN or license plate number, and the application records that the VIN is also proximate to the same secure beacon at the same date/time (within a tolerance). This ensures that in fact the odometer photo and the VIN or license plate number photo are from the same vehicle.

The phone application applies OCR techniques to the odometer reading to create a data element and compares this reading to the previous reading. The application calculates the tax based on the difference in mileage from the previous reading.

Once the tax owed is calculated the phone application then prompts the user to make payment by electronic check, ACH, or credit card, Pay Pal® or other known payment systems. These payment methods can be newly established at the time of payment or stored at the user's preference. The user makes payment and an official receipt is sent to the users stored e-mail address.

If a user wishes to account for miles driven on non-taxable roads that might be exempt from the tax, such as out of state or private roads, a BLE beacon can similarly be placed at the access point to those facilities. For example, BLE beacons can be installed at the state borders to account for out of state miles. The phone application detects these border beacons to validate that the vehicle has indeed crossed the state line. Alternatively two beacons in sequence could be used to validate the direction of travel at the state line. The secure border beacon location data is stored in the application. The phone application then sets up a large position change feature on the phone, so that the phone application is activated by the phone upon a significant change in position, or after a certain period of time has elapsed. Upon activation, the application evaluates the data from at least one GPS fix to determine the estimated miles driven from the border beacon location. Upon each subsequent activation of the application on the phone a new GPS fix is taken and an incremental number of miles driven out of state. This process continues until the phone crosses another border beacon system indicating re-entry into the state (or alternatively, a GPS position fix within the state). The total accumulated miles out of driven out of state can be determined.

In addition, if policy dictates the need to collect mileage based tax or fee at different rates on different types of roadways this can be accommodated by the system design. For example, if a different rate is to be charged for controlled access highways than arterials, beacons can be placed on the controlled access points to identify entry and exit points which allow the determination of total miles driven on controlled access highways. Those miles can be accumulated in a separate buffer such that at the time of tax payment calculation the tax due can be determined based upon the differentiated miles driven. Similarly, when miles are driven on a toll facility which might typically be exempt from a mileage charge, BLE beacons on the toll facility can be segregated to calculate the correct adjustment to the tax owed at time of payment.

Of course as described in this disclosure the BLE beacons can work with the phone application to be the primary method of toll collection, providing a seamless approach for the user to pay for services rendered.

What is claimed is:
1. A mobile device, comprising:
a receiver configured to receive signals associated with a vehicle tracking system, each of the received signals including an identifier associated with a lane, wherein the mobile device is associated with a first vehicle; and a processor configured to:
  determine a signal strength for each of the received signals,
  determine a signal of the received signals having a highest signal strength, and
  determine, based on the corresponding identifier of the determined signal, a lane of travel to determine a position of the first vehicle.

2. The mobile device of claim 1, wherein the received signals comprise Bluetooth low energy (BLE) or WiFi signals transmitted from the vehicle tracking system.

3. The mobile device of claim 2, wherein the BLE signals or WiFi signals comprise advertisement signals comprising at least one of: a beacon identifier, an identifier associated with the vehicle tracking system, a lane identifier, or a time.

4. The mobile device of claim 1, wherein, to determine the signal strength for each of the received signals, the processor is configured to:
  determine a signal strength of each of a plurality of Bluetooth low energy (BLE) or WiFi signals received from at least one antenna associated with the vehicle tracking system, and
  generate vehicle position information relative to the at least one antenna based on the determined signal strengths.

5. The mobile device of claim 1, wherein the vehicle tracking system comprises a plurality of antennas distributed at least one of across or adjacent a roadway or a multi-lane tolling plaza, and wherein the receiver is configured to receive unique advertisement signals transmitted from one or more of the plurality of antennas.

6. The mobile device of claim 5, wherein the processor is further configured to: determine the position of the first vehicle relative to a lane on the roadway based on signal strengths of the received advertisement signals.

7. The mobile device of claim 6, wherein when-determining the position of the first vehicle is based on at least one of the advertisement signals having the highest signal strength.

8. The system of claim 1, wherein the receiver is configured to receive a plurality of unique advertisements from a plurality of antennas associated with the vehicle tracking system.

9. The mobile device of claim 1, wherein the processor is configured to: generate a response to a received Bluetooth low energy (BLE) beacon signal with unique identification information.

10. The mobile device of claim 9, further comprising: a BLE transmitter configured to transmit the response.

11. The mobile device of claim 1, wherein, to determine the signal strength, the processor is configured to: identify a received signal strength indicator (RSSI) for each of the received signals, the determined signal having a highest of the identified RSSIs.

12. The mobile device of claim 11, wherein, to determine the lane of travel, the processor is configured to:
  determine an average RSSI for each of a plurality of received signals associated with a respective identifier, and
  determine the lane of travel based on the identifier associated with a highest of the determined average RSSIs.

13. The mobile device of claim 1, wherein the processor is further configured to:
  establish an account with a toll authority or third party associated with the toll authority, and
  provide for payment to the toll authority or third party based on the determined lane of travel.

14. The mobile device of claim 1, wherein, to determine the signal having the highest signal strength, the processor is configured to:
  determine an average signal strength for each of a plurality of received signals associated with a respective identifier, and
  determine the lane of travel based on the identifier associated with a highest of the determined average signal strengths.

15. A non-transitory computer-readable medium comprising instructions, which when executed by a processor of a mobile device, cause the processor to:
  receive signals associated with a vehicle tracking system, each of the received signals including an identifier associated with a lane;
  determine a signal strength for each of the received signals;
  determine a signal of the received signals having a highest signal strength; and
  determine, based on the corresponding identifier of the determined signal, a lane of travel to determine a position of a vehicle associated with the mobile device.

16. The non-transitory computer-readable medium of claim 15, wherein when determining the signal strength for each of the received signals, the instructions cause the processor to:
  determine the signal strength of each of a plurality of Bluetooth low energy (BLE) or WiFi signals received from at least one antenna associated with the vehicle tracking system, and
  generate position information for the vehicle relative to the at least one antenna based on the determined signal strengths.

17. The non-transitory computer-readable medium of claim 15, wherein, to determine the position of the vehicle, the instructions cause the processor to: determine the position of the vehicle relative to a lane on a roadway based on signal strengths of the received signals.

18. The non-transitory computer-readable medium of claim 15, wherein, to determine the signal strength for each of the received signals, the instructions cause the processor to: identify a received signal strength indicator (RSSI) for each of each of the received signals, the determined signal having a highest of the identified RSSIs.

19. The non-transitory computer-readable medium of claim 15, wherein the instructions further cause the processor to:
  establish an account with a toll authority or third party associated with the toll authority, and
  provide for payment to the toll authority or third party based on the identified lane.

20. A method for determining a vehicle position, comprising:
  receiving signals associated with a vehicle tracking system, each of the received signals including an identifier associated with a lane of a roadway;
  determining a signal strength for each of the received signals;
  determining a signal of the received signals having a highest signal strength; and
  determining, based on the corresponding identifier of the determined signal, a lane of travel to determine a position of a vehicle.

* * * * *